(12) United States Patent
Kaltenbach et al.

(10) Patent No.: US 11,884,362 B2
(45) Date of Patent: Jan. 30, 2024

(54) DRIVE ARRANGEMENT FOR A BICYCLE OR PEDELEC

(71) Applicant: ZF Friedrichshafen AG, Friedrichshafen (DE)

(72) Inventors: Johannes Kaltenbach, Friedrichshafen (DE); Uwe Griesmeier, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 210 days.

(21) Appl. No.: 17/279,300

(22) PCT Filed: Aug. 12, 2019

(86) PCT No.: PCT/EP2019/071547
§ 371 (c)(1),
(2) Date: Mar. 24, 2021

(87) PCT Pub. No.: WO2020/064197
PCT Pub. Date: Apr. 2, 2020

(65) Prior Publication Data
US 2022/0048595 A1 Feb. 17, 2022

(30) Foreign Application Priority Data

Sep. 25, 2018 (DE) ...................... 10 2018 216 378.2
Oct. 18, 2018 (DE) ...................... 10 2018 217 883.6

(51) Int. Cl.
*B62M 11/02* (2006.01)
*B62M 6/55* (2010.01)
*B62M 11/18* (2006.01)

(52) U.S. Cl.
CPC .............. *B62M 11/02* (2013.01); *B62M 6/55* (2013.01); *B62M 11/18* (2013.01)

(58) Field of Classification Search
CPC . B62M 6/55; B62M 6/40; B62M 6/50; B62M 11/02; B62M 11/18; B62M 11/145; F16H 3/72; F16H 37/06
(Continued)

(56) References Cited

U.S. PATENT DOCUMENTS 8,550,199 B2 10/2013 Moeller et al.
11,453,460 B2 * 9/2022 Tenberge ................ F16H 3/724
(Continued)

FOREIGN PATENT DOCUMENTS

DE    202014010823 U1    10/2016
DE    102016224314 A1    6/2017
(Continued)

OTHER PUBLICATIONS

International Search Report (English Translation) PCT/EP2019/071547, dated Nov. 8, 2019. (3 pages).
(Continued)

*Primary Examiner* — Anne Marie M Boehler
(74) *Attorney, Agent, or Firm* — Dority & Manning, P.A.

(57) ABSTRACT

A drive arrangement for a bicycle or pedelec includes a manual drive shaft (1) in a housing (2). A rotor (3) of a first electric drive (EM 1) is arranged axially parallel to the manual drive shaft (1), and a rotor (4) of a second electric drive (EM2) is arranged coaxially to the manual drive shaft (1). The rotor (3) of the first electric drive (EM 1) is coupled to a first planetary gear set (PS 1) as a superposition gearbox via a first fixed ratio. The rotor (4) of the second electric drive (EM 2) is coupled to the manual drive shaft (1) via a second fixed ratio. The manual drive shaft (1) is coupled to the first planetary gear set (PS 1) as the superposition gearbox, and the first planetary gear set (PS 1), as the superposition gearbox, is coupled to an output (5).

14 Claims, 7 Drawing Sheets

(58) Field of Classification Search
USPC .............................. 180/206.1, 206.3, 206.4
See application file for complete search history.

(56) References Cited

U.S. PATENT DOCUMENTS

| | | | |
|---|---|---|---|
| 11,661,137 B2* | 5/2023 | Kobayashi | B62M 6/55 74/665 B |
| 2011/0303474 A1* | 12/2011 | Kimmich | B62M 6/55 180/206.3 |
| 2015/0122565 A1 | 5/2015 | Deleval | |
| 2016/0245386 A1 | 8/2016 | Rossberger | |
| 2017/0137088 A1* | 5/2017 | Watarai | B62M 11/145 |
| 2017/0183056 A1 | 6/2017 | Yamamoto | |
| 2017/0219066 A1 | 8/2017 | Yamamoto | |
| 2017/0259883 A1* | 9/2017 | Yamamoto | F16H 3/724 |
| 2017/0291660 A1* | 10/2017 | Deleval | B62M 6/55 |
| 2019/0127024 A1* | 5/2019 | Hoppach | B62M 11/145 |
| 2019/0382080 A1 | 12/2019 | Kaltenbach et al. | |
| 2020/0198727 A1* | 6/2020 | Deleval | B62M 6/50 |
| 2022/0258832 A1* | 8/2022 | Peltola | B62M 6/55 |

FOREIGN PATENT DOCUMENTS

| | | | | |
|---|---|---|---|---|
| DE | 102017000342 A1 | 8/2017 | | |
| DE | 102016225145 A1 | 6/2018 | | |
| DE | 102016225165 A1 | 6/2018 | | |
| EP | 2218634 A1 | 8/2010 | | |
| JP | 2016181851 A | 10/2016 | | |
| WO | WO-2011131725 A1 * | 10/2011 | | B62K 19/34 |
| WO | WO 2016034574 A1 | 3/2016 | | |

OTHER PUBLICATIONS

German Search Report DE102018217883.6, dated Jun. 12, 2019. (10 pages).

* cited by examiner

US 11,884,362 B2

DRIVE ARRANGEMENT FOR A BICYCLE OR PEDELEC

CROSS-REFERENCE TO RELATED APPLICATIONS

The present application is related and has right of priority to German Patent Application No. 102018216378.2 filed in the German Patent Office on Sep. 25, 2018, German Patent Application No. 102018217883.6 filed in the German Patent Office on Oct. 18, 2018, and is a nationalization of PCT/EP2019/071547 filed in the European Patent Office on Aug. 12, 2019, all of which are incorporated by reference in their entirety for all purposes.

FIELD OF THE INVENTION

The present invention relates generally to a drive arrangement for an electric motor-assisted bicycle or pedelec with a manual drive shaft in a housing and with a first, larger-dimensioned electric drive and with a second, smaller-dimensioned electric drive. The invention further relates generally to an electric motor-assisted bicycle or pedelec with the drive arrangement.

BACKGROUND

For example, publication WO 2016/034574 describes a drive arrangement for a pedelec, in which a first, larger-dimensioned electric drive and a second, smaller-dimensioned electric drive are provided. The larger drive is arranged coaxially to the bottom bracket crankshaft, while the smaller drive is provided axially parallel to the bottom bracket crankshaft. A planetary transmission is provided as a superposition gearbox or differential gearbox, which takes up a large amount of installation space, since the superposition gearbox must implement a large ratio. The first drive is directly connected to a sun gear of the planetary transmission. Since the sun gear extends through the bottom bracket crankshaft, a minimum diameter of the sun gear is necessary. A correspondingly large-dimensioned first drive is also necessary to support the sun gear of the large-sized planetary transmission, in order to implement a necessary support torque or reaction torque for the pedaling force of the rider and, if necessary, an assist torque for the second electric drive. Disadvantageously, the installation space requirement is considerable in the known drive arrangement, both in the axial direction and in the radial direction.

BRIEF SUMMARY OF THE INVENTION

Example aspects of the present invention provide a drive arrangement and a bicycle or pedelec, with which a superposition function is implementable with the smallest possible installation space requirement.

A drive train for a motor-assisted bicycle or pedelec with a manual drive shaft in a housing is therefore proposed. In order to create an arrangement which is optimized in terms of design, a rotor of a first electric drive arranged axially parallel to the manual drive shaft and a rotor of a second electric drive arranged coaxially to the manual drive shaft are provided. The rotor of the first electric drive is coupled to a first planetary gear set as a superposition gearbox via a first fixed ratio. The rotor of the second electric drive is coupled to the manual drive shaft via a second fixed ratio. The manual drive shaft is coupled or connected to the first planetary gear set as a superposition gearbox. The first planetary gear set, as a superposition gearbox, is coupled or connected to an output.

Due to the proposed connection and arrangement of the electric drives and further transmission components as compared to known drive arrangements, a drive arrangement which is optimized in terms of installation space is created.

An example refinement of the invention can provide that the first electric drive is dimensioned larger than the second electric drive. Therefore, the first electric drive is dimensioned larger and the second electric drive is dimensioned smaller. A drive arrangement that is particularly well optimized in terms of installation space is created in that the larger of the two drives and/or the large-dimensioned electric drive, which can vary a cadence, is arranged axially parallel, while the smaller and/or small-dimensioned drive, which is fixedly connected to the manual drive shaft, is arranged coaxially to the manual drive shaft. This yields the advantage that less installation space is necessary in the area of the manual drive shaft, since the smaller-dimensioned second electric drive is arranged there. Since the larger electric drive is arranged axially parallel, more installation space in the axial direction results on the axis of the larger electric drive, because, with the larger first drive, only the first fixed ratio is arranged in the area of the axis.

A superposition function is implemented by the superposition gearbox, which provides for a speed variability, i.e., the cadence is variable by changing the rotational speed of the first electric drive at a given ground speed via the superposition function of the superposition gearbox. For this reason, no conventional mechanical multiplication device is necessary. Accordingly, with the drive arrangement according to example aspects of the invention, a CVT transmission is practically implemented, and so no conventional mechanical ratio-adjusting device, such as, for example, a derailleur gear or a hub gear, is necessary. The term CVT generally refers to a continuously variable transmission.

Within the scope of an example refinement of the invention, a single-stage or multi-stage spur gear train or ratio is provided as a first fixed ratio for the first electric drive. The term fixed ratio is understood by a person skilled in the art to mean a ratio with a constant ratio value. The spur gear ratio can be formed, for example, in a countershaft design, i.e., with a countershaft. Instead of a spur gear ratio, however, an additional planetary transmission and/or a planetary gear set can also be provided. The spur gear ratio or the planetary gear set can be connected to the superposition gearbox, for example, via a chain or belt drive or also via an intermediate gear, and so the drive power of the first electric drive acts upon the superposition gearbox with a constant ratio.

A next example embodiment of the invention can provide that a harmonic drive/gearset, or the like, is provided as a second fixed ratio. The harmonic drive can be compared, in terms of function, to a simple plus planetary gear set. One element of the harmonic drive is fixed to the housing, and so a constant ratio of the second drive acts upon the manual drive shaft. Instead of a harmonic drive, a planetary transmission and/or planetary gear set can also be provided as a second fixed ratio for the second electric drive. Regardless of the particular example embodiment, the second fixed ratio acts upon the manual drive shaft, which is then connected to the superposition gearbox.

Regardless of the particular example embodiments of the invention, in the drive arrangement, the first fixed ratio is directly or indirectly connected to a sun gear of the first planetary transmission as a superposition gearbox. The particular drive power of the first electric drive is thereby transmitted to the superposition gearbox with a constant ratio. The manual drive shaft is directly or indirectly connected to a planet carrier and the output of the drive arrangement is directly or indirectly connected to a ring gear of the superposition gearbox, or the manual drive shaft is directly or indirectly connected to the ring gear and the output is directly or indirectly connected to the planet carrier of the superposition gearbox.

A particularly advantageous example embodiment of the present invention is achieved in that the manual drive shaft is designed as a bottom bracket crankshaft and the housing is designed as a bottom bracket shell. Accordingly, the proposed drive arrangement is accommodated in a bottom bracket shell of the pedelec as a mid-drive motor.

One further example aspect of the present invention is a motor-assisted bicycle or a pedelec with the above-described drive arrangement. A pedelec with an electric CVT with an input-coupled electric drive coaxial to the bottom bracket crankshaft is therefore proposed. This yields the above-described advantages and further advantages.

BRIEF DESCRIPTION OF THE DRAWINGS

Example aspects of the present invention are explained in greater detail in the following with reference to the drawings. Wherein.

DETAILED DESCRIPTION

Figure 1:
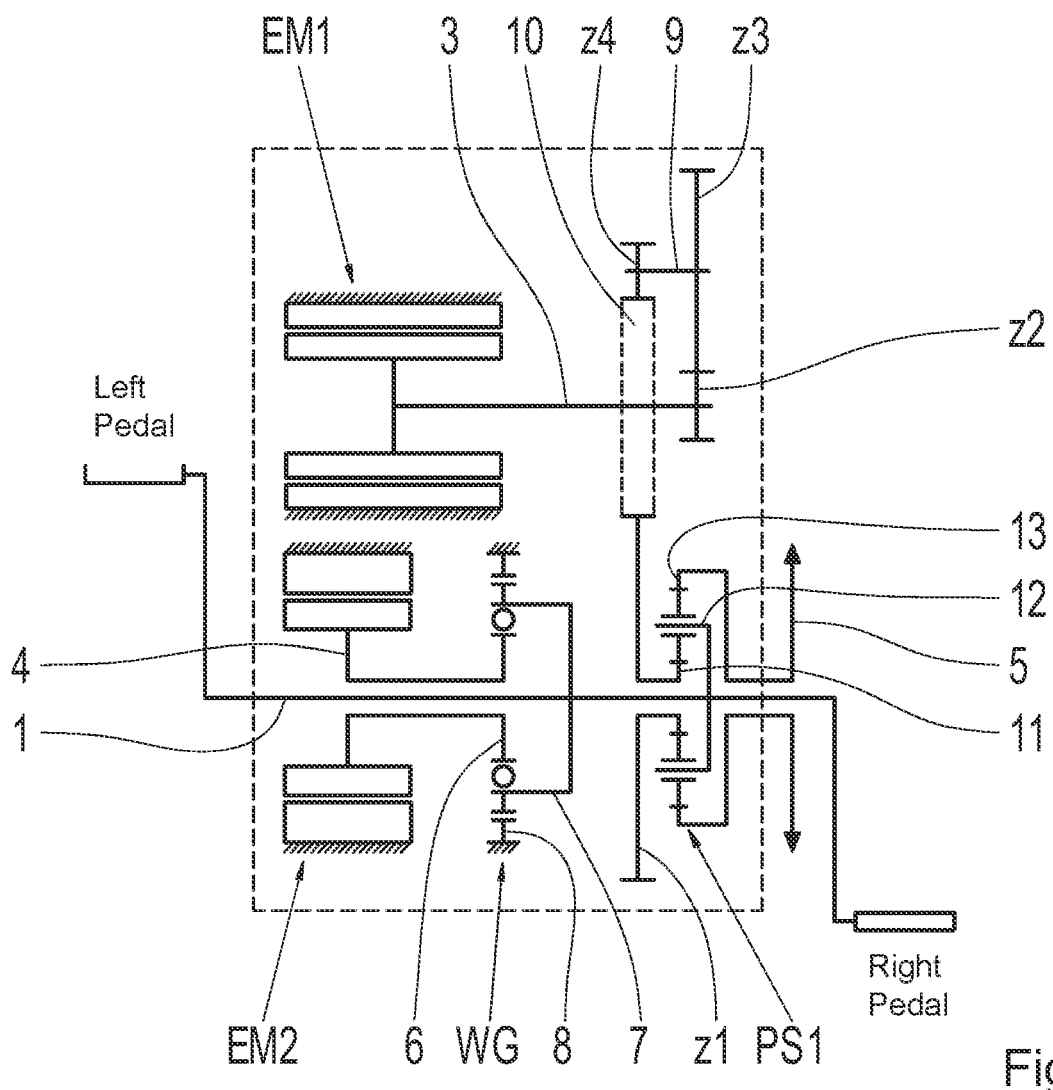
FIG. 1 shows a diagrammatic view of a first example embodiment variant of a drive arrangement according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIGS. 1 through 9, various example embodiment variants of a drive arrangement according to example aspects of the invention for a bicycle or pedelec are presented exclusively by way of example and, therefore, do not limit the various above-described and claimed structural alternatives.

The drive arrangement includes a manual drive shaft 1 in a housing 2, wherein the drive shaft 1 in the example embodiment variants shown is designed, by way of example, as a bottom bracket crankshaft and is arranged in a bottom bracket shell as the housing 2. In this context, the term manual drive shaft 1 means that this is a drive shaft that can be driven or operated by muscle power of a rider. The pedal crankshaft, i.e., a crankshaft stepped on by the foot, is therefore an exemplary embodiment for the manual drive shaft 1.

The drive arrangement includes a rotor 3 of a first, for example, larger electric drive EM 1 arranged axially parallel to the manual drive shaft 1 and a rotor 4 of a second, for example, smaller electric drive EM 2 arranged coaxially to the manual drive shaft 1. In this context, the term larger means larger-dimensioned and the term smaller means smaller-dimensioned. Accordingly, the first electric drive EM 1 has a higher power and/or larger dimensions than the second electric drive EM 2. The first electric drive EM 1 and the second electric drive EM 2 are preferably both designed as electric machines, which are operable both as a motor and as a generator.

With respect to the proposed drive arrangement, the rotor 3 of the first electric drive EM 1 is coupled to a first planetary gear set PS 1 as a superposition gearbox via a first fixed ratio. The rotor 4 of the second electric drive EM 2 is coupled to the manual drive shaft via a second fixed ratio. Accordingly, the second electric drive EM 2 is input-coupled at the bottom bracket crankshaft and/or the manual drive shaft 1 via the second fixed ratio. The manual drive shaft 1 is connected to the first planetary gear set PS 1 as a superposition gearbox, wherein the first planetary gear set PS 1, as a superposition gearbox, is connected to an output 5 of the drive arrangement. The output 5 can preferably be designed as a sprocket or a belt pulley of the bicycle or pedelec and arranged outside or inside the housing 2. The first planetary gear set PS 1, as a superposition gearbox, is therefore arranged coaxially to the bottom bracket crankshaft and/or the manual drive shaft 1.

In FIG. 1, a first example embodiment variant of the drive arrangement is shown by way of example, in which a two-stage spur gear ratio or train, as a first fixed ratio, is associated with the first electric drive EM 1. The rotor 3 of the first electric drive EM 1 is connected to a first gearwheel Z2 of a first stage of the spur gear ratio. The first gearwheel Z2 is engaged or meshed with a second gearwheel Z3 of the first stage of the spur gear ratio and is rotationally fixed to a countershaft 9. A first gearwheel Z4 of a second stage of the spur gear ratio is also rotationally fixed to the countershaft 9 and is coupled via a belt or chain drive 10 to a second gearwheel Z1 of the second stage of the spur gear ratio, which is connected to a sun gear 11 of the first planetary gear set PS 1 as a superposition gearbox. A planet carrier 12 of the first planetary gear set PS 1 is connected to the manual drive shaft 1. A ring gear 13 of the first planetary gear set PS 1 is connected to the output 5.

As a second fixed ratio, a harmonic drive WG is associated with the second electric drive EM 2. The harmonic drive WG is also referred to, among other things, as a strain wave gearing or a sliding wedge gearing. The harmonic drive WG includes a wave generator 6, an inner bush 7, and an outer bush 8. The outer bush 8 includes an internal gearing and the inner bush 7 includes an external gearing, which are mutually engaged via, for example, two circumferential portions. The cross-section of the outer bush 8 is circular. The inner bush 7 is designed to be deformable. Due to the wave generator 6, which has an elongated or elliptical shape, the inner bush 7 is pressed with the external gearing of the inner bush 7 via, for example, two circumferential portions, into the internal gearing of the outer bush 8. The number of teeth of the external gearing of the inner bush 7 and of the internal gearing of the outer bush 8 are different from each other.

The wave generator 6 of the harmonic drive WG is connected to the rotor 4 of the second electric drive EM 2 and forms the input from the perspective of the second electric drive EM 2. The deformable inner bush 7 with external gearing of the harmonic drive WG is connected to the manual drive shaft 1 and forms the output from the perspective of the second electric drive EM 2. The outer bush 8 with internal gearing of the harmonic drive WG is fixed to the housing. The harmonic drive WG therefore acts as a second fixed ratio of the second electric drive EM 2.

Accordingly, the smaller second electric drive EM 2 is arranged coaxially to the bottom bracket crankshaft and/or the manual drive shaft 1. The harmonic drive WG acts only as a second fixed ratio for the second electric drive EM 2 with respect to the manual drive shaft 1. This yields the advantage that the harmonic drive WG is loaded only by the second electric drive EM 2 and not by the pedaling force of the rider. Accordingly, the harmonic drive WG can be dimensioned appropriately smaller and implements a high ratio with an advantageously low installation space requirement. The manual drive shaft 1 is also connected at the first planetary gear set PS 1 as a superposition gearbox, for example, via the carrier and/or via the planet carrier 12. The input takes place via the ring gear 13 of the first planetary gear set PS 1. The sun gear 11 of the first planetary gear set PS 1 is connected at the first electric drive EM 1 via the two-stage spur gear ratio. This yields the advantage as compared to known drive arrangements that less torque from the bottom bracket crankshaft and/or manual drive shaft 1 must be supported at the sun gear 11, because the manual drive shaft 1 is connected to the planet carrier 12. The larger first electric drive EM 1 is arranged axially parallel and connected at the sun gear 11 of the first planetary gear set PS 1 via the two-stage spur gear ratio as a first fixed ratio, whereby the advantage results that more axial installation space is therefore available for the larger, first electric drive EM 1 than for the smaller, second electric drive EM 2.

A fixed ratio as high as for the second electric drive EM 2 is not possible for the first electric drive EM 1, since the first electric drive EM 1 must cover a higher rotational speed range than the second electric drive EM 2. The cadence is varied at different ground speeds via the rotational speed of the first electric drive EM 1. The second electric drive EM 2 always rotates in the same ratio with respect to the manual drive shaft 1, the rotational speed of which is limited by the possible rotational speed of the crankset that can be achieved by the rider. A two-stage spur gear ratio for the first electric drive EM 1 is therefore sufficient as a first fixed ratio. The first electric drive EM 1 needs more torque than the second electric drive EM 2, which can be achieved, for example, by a greater length of the electric machine. In the represented example, the two-stage spur gear ratio for the first drive EM 1 is made up of the first gear pair Z2/Z3 and the second gear pair Z4/Z1. A chain or a toothed belt can be utilized as a chain or belt drive 10 to overcome the center distance.

Figure 2:
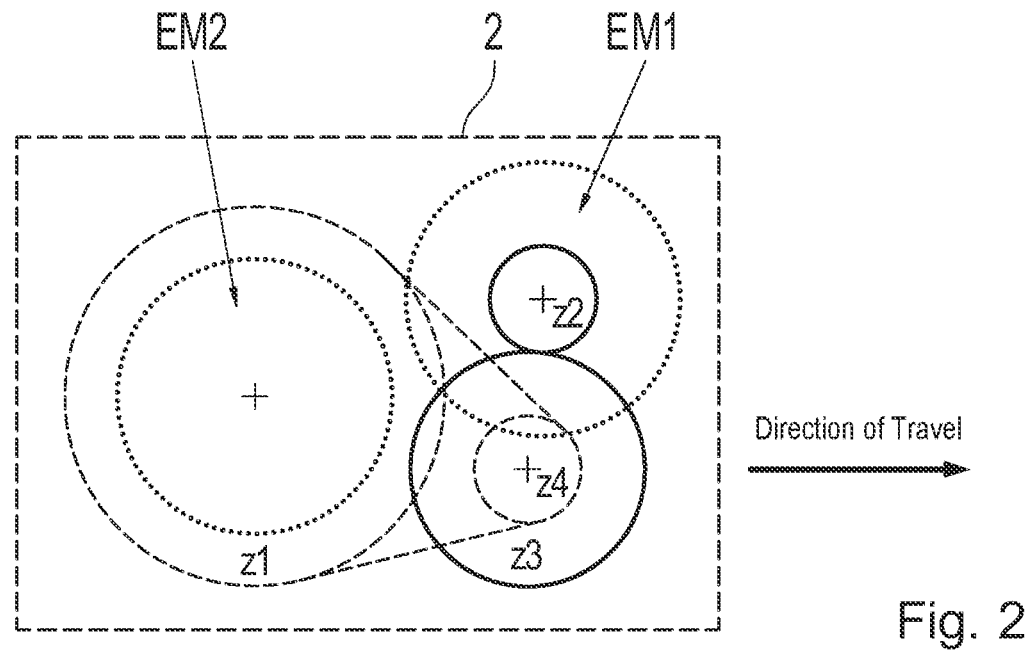
FIG. 2 shows a diagrammatic side view of the first example embodiment variant according to FIG. 1.

In FIG. 2, a side view of the first example embodiment variant from the right, according to FIG. 1, is represented, from which the outer perimeters of the various transmission components become clear. The components situated at the front in the side view are marked by a solid line, while dashed lines indicate the components of a plane situated behind these. Dotted lines represent components of a further plane situated behind these. Moreover, the direction of travel of the pedelec is indicated by an arrow. An exemplary lube oil concept becomes clear from this view. The gearwheels Z1 and Z3 can plunge, for example, into an oil sump of the housing 2 and, as a result, introduce lube oil into the particular tooth contact or chain contact.

A numerical example is described in the following. A value of fifty (50) can be assumed as a ratio of the harmonic drive WG. The stationary transmission ratio of the first planetary gear set PS 1 as the superposition gearbox can be negative two (−2). As a result, the torque ratio of the sun gear 11 with respect to the planet carrier 12 is approximately three (3) and the torque ratio of the ring gear 13 with respect to the planet carrier 12 is one and a half (1.5). The ratio of the output with respect to the rear wheel of the pedelec is one and an eighth (1.125). The wheel circumference of the rear wheel is two and one-tenth of a meter (2.1 m). The two-stage spur gear ratio of the first electric drive EM 1 with respect to the sun gear 11 is seventeen (17). Efficiencies are neglected in the following numerical examples. The information is not exact.

An exemplary riding situation during the starting operation with high torque at the manual drive shaft 1 of one hundred and fifty Newton-meters (150 Nm), which is applied by the rider. All rotational speeds are zero (0). The torque at the second electric drive EM 2 is zero (0), since there is no assistance, since the rider is applying a high pedal force. The torque at the sun gear 11 is fifty Newton-meters (50 Nm). The torque at the first electric drive EM 1 is three Newton-meters (3 Nm). The torque at the ring gear 13 is one hundred Newton-meters (100 Nm). The torque at the rear wheel is one hundred and thirteen Newton-meters (113 Nm).

An identical riding situation, but with assistance by the second electric drive EM 2, is described in the following. The torque at the manual drive shaft 1, which is applied by the rider, is fifty Newton-meters (50 Nm). The torque at the second electric drive EM 2 is two Newton-meters (2 Nm) and yields one hundred Newton-meters (100 Nm) downstream from the harmonic drive WG as a fixed ratio. Together with the rider, one hundred and fifty Newton-meters (150 Nm) is applied again. The torque at the second electric drive EM 2 and at the rear wheel is identical.

In a further riding situation during travel, for example, at twenty-five kilometers per hour (25 km/h) with high power, for example, three hundred and fifty watts (350 W) total power, for example, uphill, a cadence of sixty rotations per minute (60 rpm), and a pedaling torque of sixteen Newton-meters (16 Nm) results, i.e., the rider outputs one hundred and one watts (101 W). The second electric drive EM 2 provides light assistance, with thirteen hundredths of a Newton-meter (0.13 Nm) at three thousand rotations per minute (3000 rpm), i.e., a power of forty watts (40 W). The rotational speed at the rear wheel is one hundred and ninety eight rotations per minute (198 rpm), at the ring gear 13 approximately two hundred and twenty-three rotations per minute (223 rpm), at the sun gear 11 approximately negative two hundred and sixty-six rotations per minute (266 rpm) (rotating in reverse), and at the first electric drive EM 1 approximately negative four thousand, five hundred and thirty rotations per minute (4530 rpm) (rotating in reverse). The torque at the planet carrier 12 results from the sum of the torques of the second electric drive EM 2 and of the rider of six and half Newton-meters (6.5 Nm) plus sixteen Newton-meters (16 Nm) equals twenty-two and a half Newton-meters (22.5 Nm). The torque at the sun gear 11 is seven and a half Newton-meters (7.5 Nm), i.e., the torque at the first electric drive EM 1 is forty-three hundredths of a Newton-meter (0.43 Nm). The torque at the ring gear 13 is fifteen Newton-meters (15 Nm) and the torque at the rear wheel is seventeen Newton-meters (17 Nm). The power of the first electric drive EM 1 is two hundred and nine watts (209 W). The total power of the rider and the first electric drive EM 1 and the second electric drive EM 2 is three hundred and fifty watts (350 W).

In a further riding situation, for example, during travel above twenty-five kilometers per hour (25 km/h), no electric assistance is permitted. The first electric drive EM 1 must support, at the sun gear 11 of the superposition gearbox, the torque applied by the rider and, thereby, absolutely introduces electrical power. Precisely this power must be generated with the second electric drive EM 2 acting as a generator, since this power is not permitted to be withdrawn from the battery. This corresponds to a battery-neutral, power-split operating mode, in which the second electric drive EM 2 acts in a decelerating manner.

A numerical example therefor: Assuming thirty kilometers per hour (30 km/h), two hundred watts (200 W) riding power, seventy rotations per minute (70 rpm) cadence, pedaling torque of the rider twenty-seven 27 Newton-meters (Nm) (yields two hundred watts (200 W) power), rotational speed of the first electric drive EM 1 negative five thousand, five hundred and forty rotations per minute (5540 rpm), torque of the first electric drive EM 1 approximately twenty-one hundredths of a Newton-meter (0.21 Nm), power of the first electric drive EM 1 approximately one hundred and twenty-one watts (121 W), power of the second electric drive EM 2 to be generated approximately negative one hundred and twenty-one watts (121 W), rotational speed of the second electric drive EM 2 approximately three thousand, five hundred rotations per minute (3500 rpm) and a torque of negative thirty-three hundredths of a Newton-meter (0.33 Nm), power of the second electric drive EM 2 to be output approximately negative one hundred and twenty-one watts (121 W).

Figure 3:
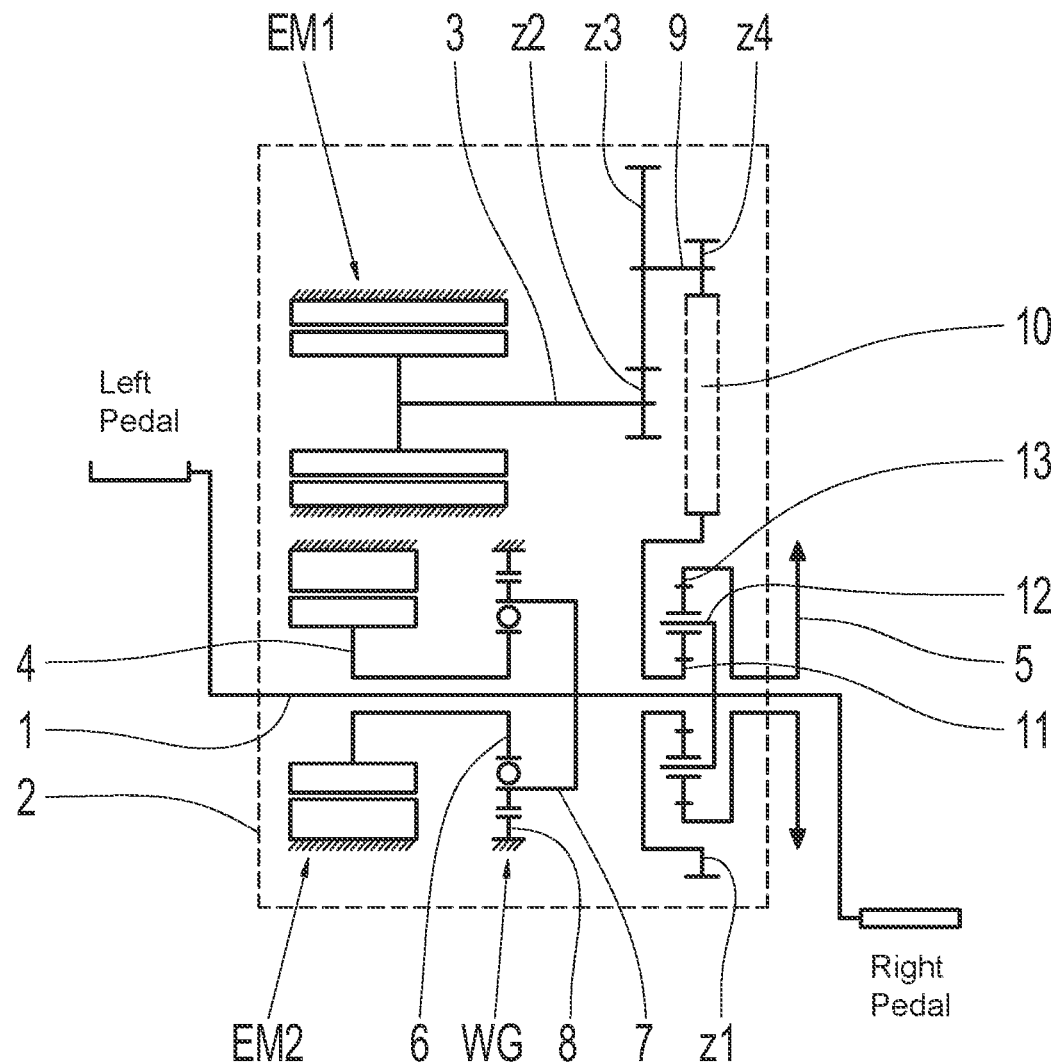
FIG. 3 shows a diagrammatic view of a second example embodiment variant of the drive arrangement.

In FIG. 3, a second example embodiment variant of the drive arrangement is represented by way of example. In contrast to the first example embodiment variant according to FIG. 1, the second gearwheel Z1 of the second stage of the two-stage spur gear drive and/or the two-stage spur gear ratio is arranged radially nested over the first planetary gear set PS 1. In this way, a shortened installation length results in the axial direction of the manual drive shaft 1. A further advantage results from the fact that the larger gearwheel Z3 of the second stage of the spur gear ratio is situated farther inward at the housing 2 as compared to the gearwheel Z4 of the first stage and the housing 2 can be slightly beveled toward the outside.

Figure 4:
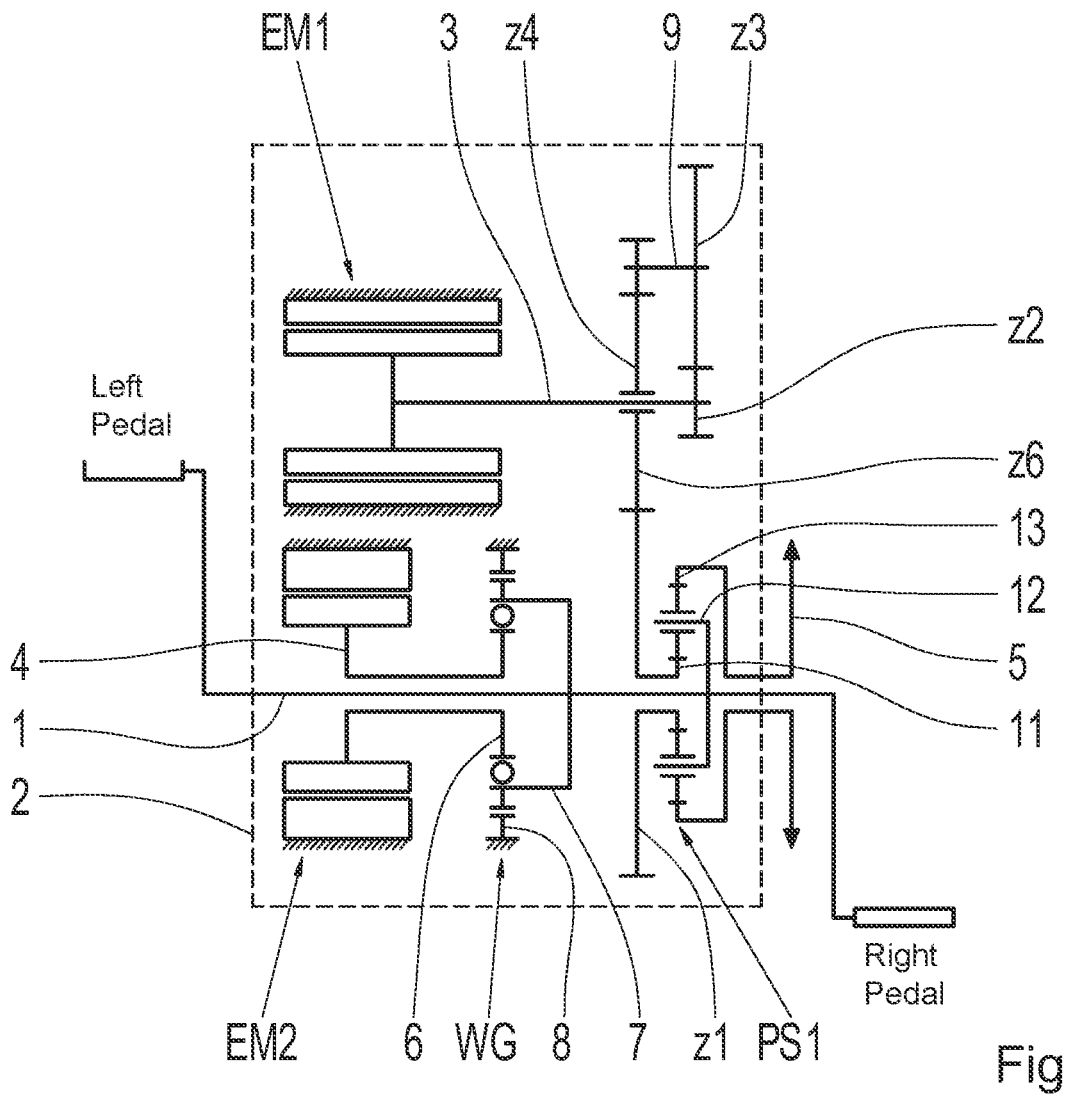
FIG. 4 shows a diagrammatic view of a third example embodiment variant of the drive arrangement.

In FIG. 4, a third example embodiment variant of the drive arrangement is represented by way of example. In contrast to the first example embodiment variant according to FIG. 1, an intermediate gear Z6 is utilized instead of the chain or belt drive 10. The intermediate gear Z6 can be mounted, for example, on the rotor shaft and/or the rotor 3 of the first electric drive EM 1.

Figure 5:
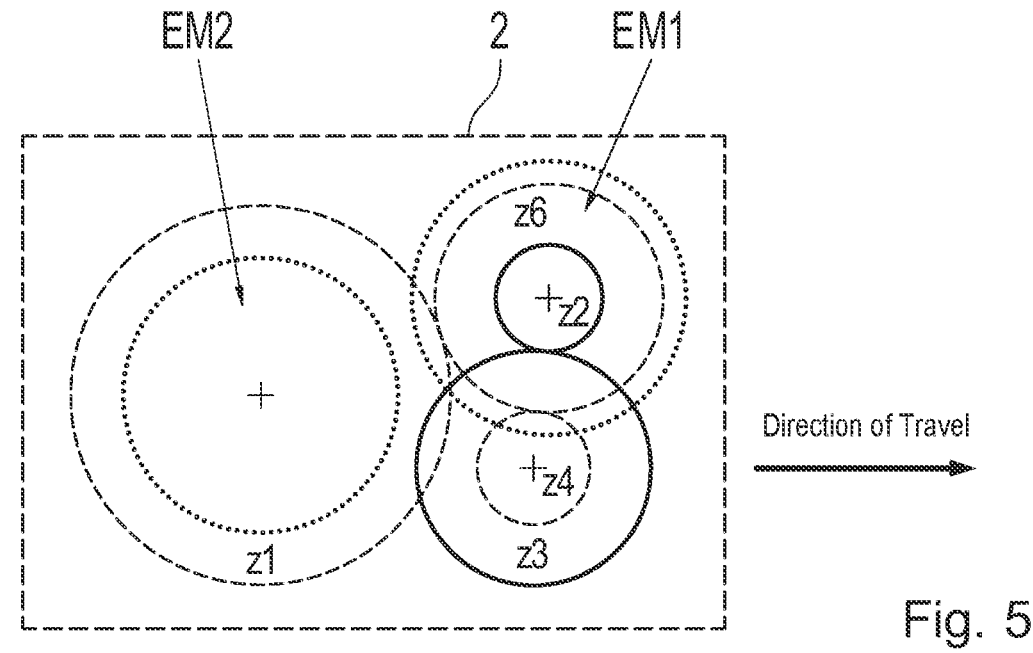
FIG. 5 shows a diagrammatic side view of the third example embodiment variant according to FIG. 4.

FIG. 5 shows a side view of the third example embodiment variant, from which the advantageous lubricating concept arises, which has already been described with reference to FIG. 2.

Figure 6:
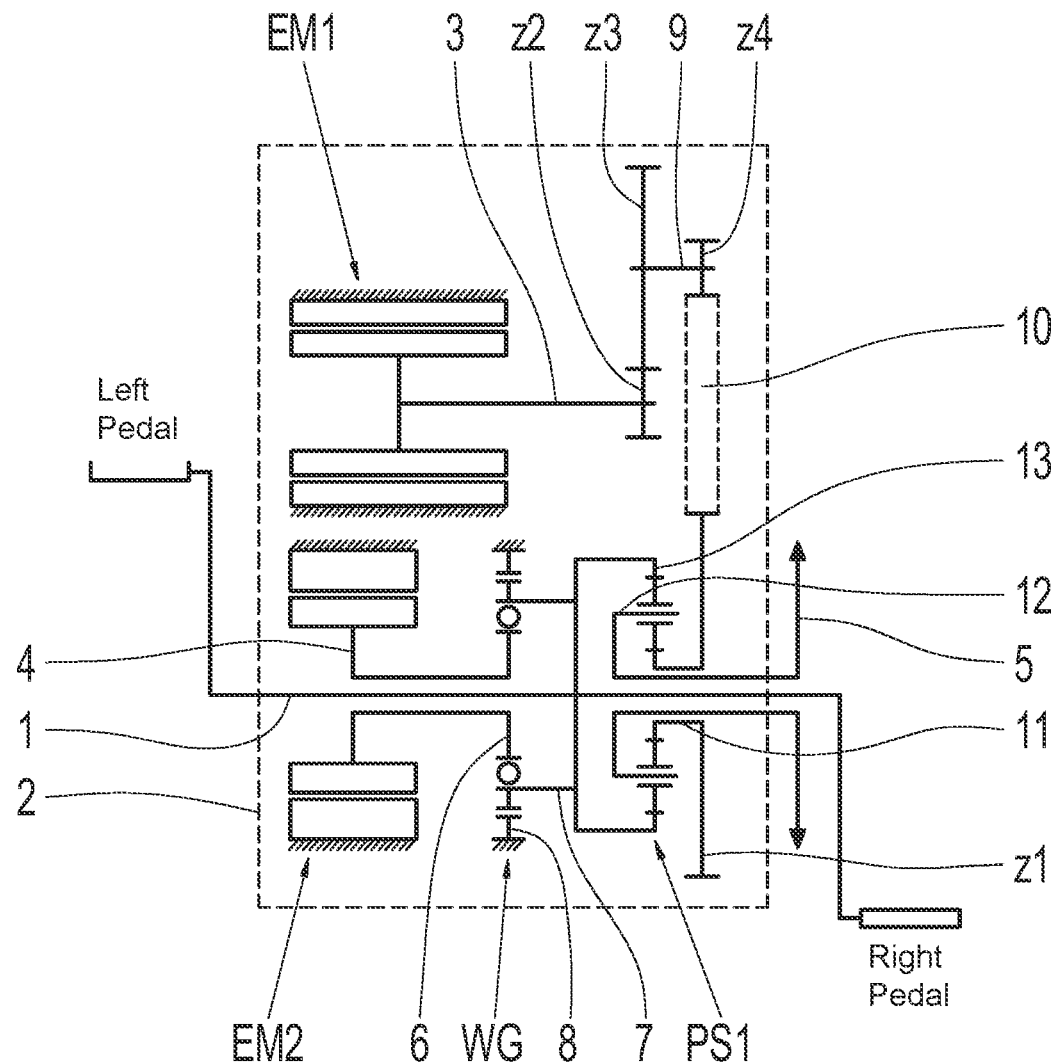
FIG. 6 shows a diagrammatic view of a fourth example embodiment variant of the drive arrangement.

FIG. 6 shows a fourth example embodiment variant of the drive arrangement, in which, in contrast to the first example embodiment variant, the manual drive shaft 1 is connected at the ring gear 13 of the first planetary gear set PS 1 as an superposition gearbox and the output 5 is connected at the planet carrier 12. Accordingly, the connection is interchanged. This yields the advantage that the connection between the manual drive shaft 1 and the ring gear 13 and the connection between the manual drive shaft 1 and the harmonic drive WG can be designed in one common component. A further advantage results from the fact that the larger first gearwheel Z3 of the second stage of the spur gear ratio, as a first fixed ratio, is situated farther inward at the housing 2 as compared to the second gearwheel Z4 and the housing 2 can be slightly beveled toward the outside. In order to support a higher torque at the sun gear 11 of the first planetary gear set PS 1, a higher ratio can be implemented via the first fixed ratio or the first electric drive EM 1 is designed with a higher torque.

Figure 7:
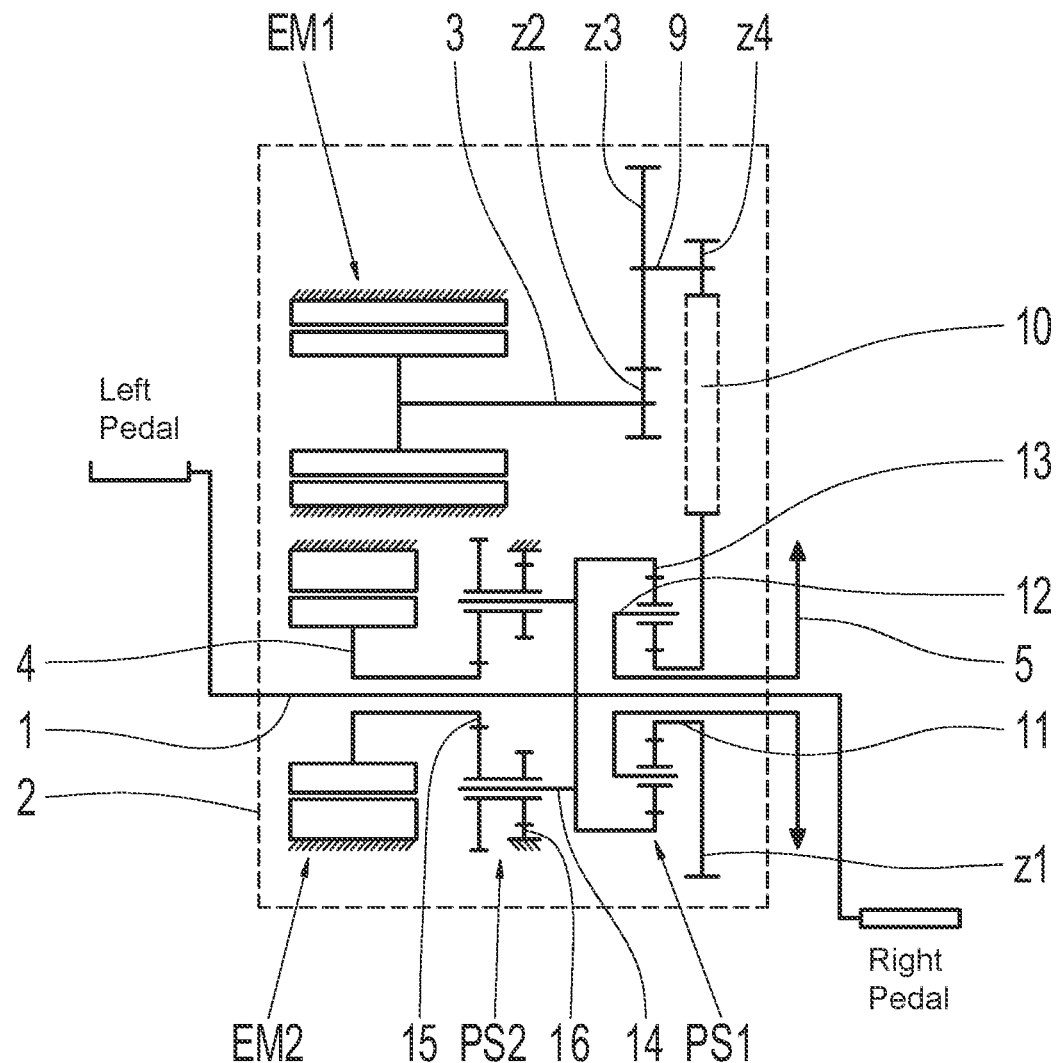
FIG. 7 shows a diagrammatic view of a fifth example embodiment variant of the drive arrangement.

In FIG. 7, a fifth example embodiment variant of the drive arrangement is represented. In contrast to the first example embodiment variant according to FIG. 1, a planetary transmission and/or a second planetary gear set PS2 is utilized instead of a harmonic drive WG as a second fixed ratio for the second electric drive EM 2. In the example shown, the second planetary gear set PS2 is designed with a stepped planet, in order to implement the highest ratio possible. In this example embodiment, the stepped planet includes two planet gears mounted on a planet carrier 14, wherein the one planet gear intermeshes with a ring gear 16 and the other planet gear intermeshes with a sun gear 15 of the second planetary gear set PS 2. This yields the advantage that a planet carrier 14 of the second planetary gear set PS2 and the ring gear 13 of the first planetary gear set PS 1 can be designed as a common component and can be connected at the manual drive shaft 1. The sun gear 15 of the second planetary gear set PS2 is connected to the rotor 4 of the second electric drive EM 2, while the ring gear 16 of the second planetary gear set PS2 is fixed to the housing 2.

Figure 8:
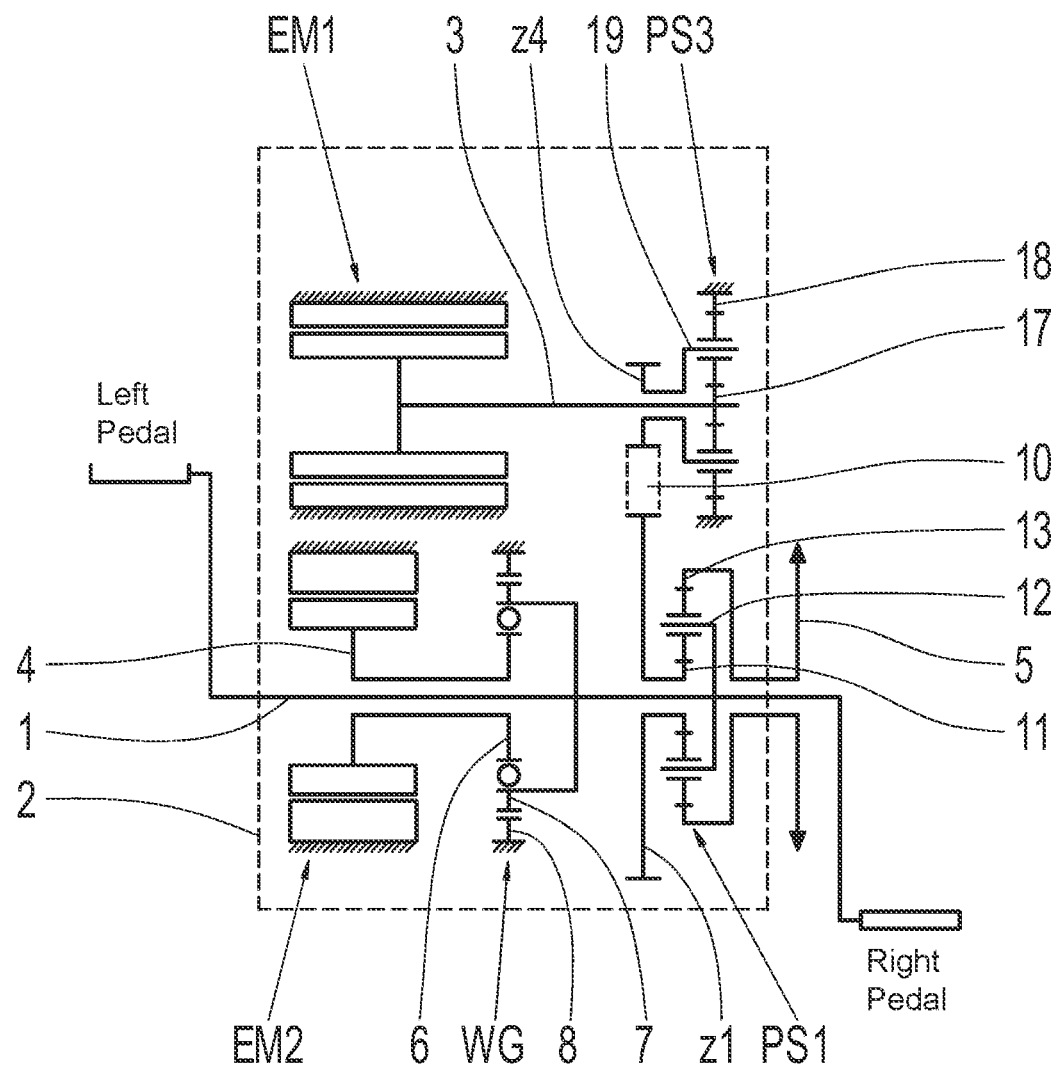
FIG. 8 shows a diagrammatic view of a sixth example embodiment variant of the drive arrangement.

According to FIG. 8, a sixth example embodiment variant of the drive arrangement is represented. In contrast to the first example embodiment variant according to FIG. 1, a third planetary gear set PS3 is utilized as a first fixed ratio of the first electric drive EM 1. A sun gear 17 of the third planetary gear set PS3 is connected to the rotor 3 of the first electric drive EM 1. A ring gear 18 of the third planetary gear set PS3 is fixed to the housing, while a planet carrier 19 of the third planetary gear set PS3 is connected to the first gearwheel Z4 of the second stage of the spur gear ratio.

Figure 9:
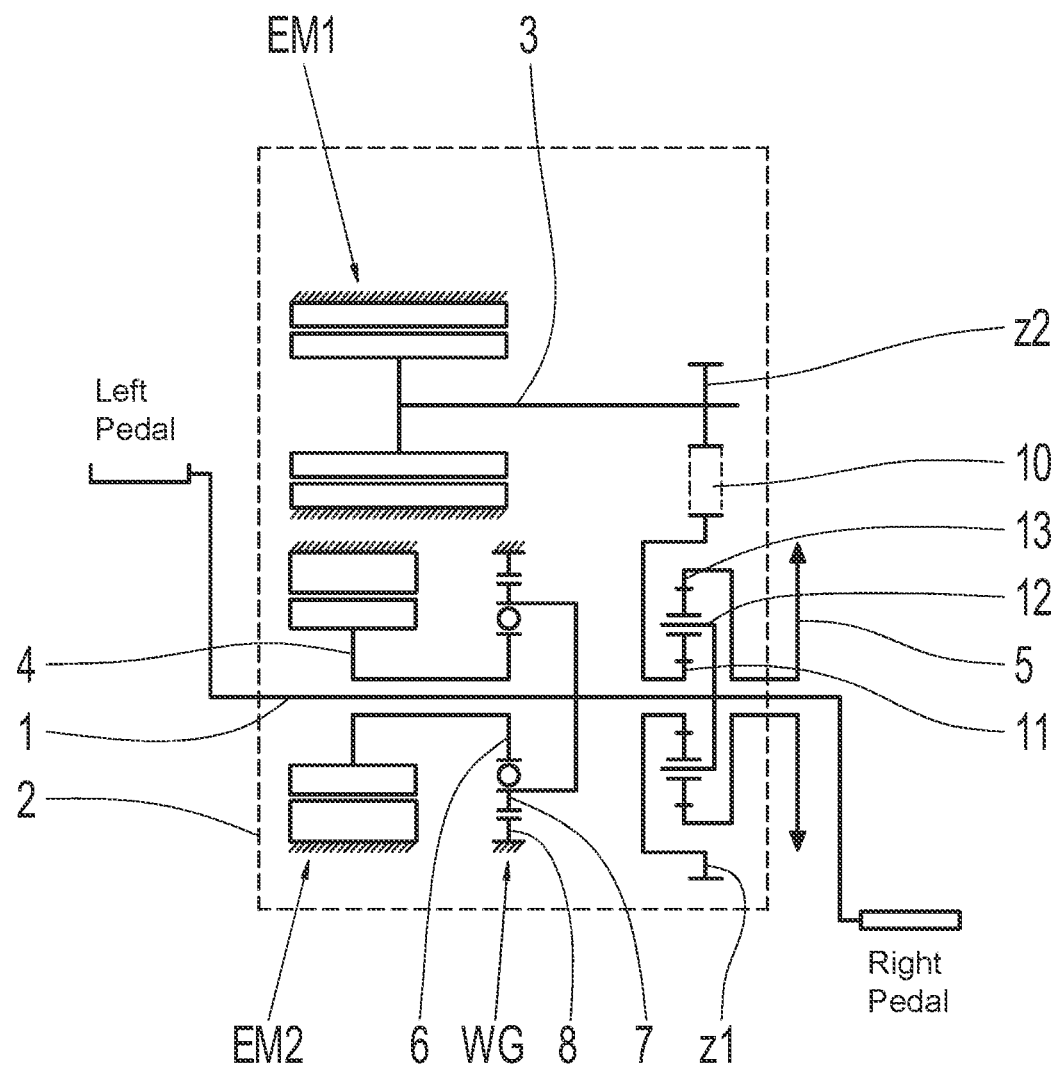
FIG. 9 shows a diagrammatic view of a seventh example embodiment variant of the drive arrangement.

In FIG. 9, a seventh example embodiment variant of the drive arrangement is represented, in which, in contrast to the second example embodiment variant according to FIG. 3, a single-stage spur gear ratio, as a first fixed ratio, is associated with the first electric drive EM 1. The gear stage is connected at the sun gear 11 of the first planetary gear set PS 1. For this purpose, the first electric drive EM 1 is designed with more torque. Due to the single-stage spur gear ratio, more installation length is available for the first electric drive EM 1, since the second spur gear stage is omitted. Advantageously, a simpler mechanism results. The gearwheel Z2 of the spur gear stage can be connected with a chain or belt drive to the gearwheel Z1. Alternatively, an intermediate gear 6 can also be provided.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 manual drive shaft and/or bottom bracket crankshaft
2 housing and/or bottom bracket shell
3 rotor of the first electric drive
4 rotor of the second electric drive
5 output and/or sprocket or belt pulley
6 wave generator
7 inner bush
8 outer bush
9 countershaft
10 belt or chain drive
11 sun gear of the first planetary gear set
12 planet carrier of the first planetary gear set
13 ring gear of the first planetary gear set
14 planet carrier of the second planetary gear set
15 sun gear of the second planetary gear set
16 ring gear of the second planetary gear set
17 sun gear of the third planetary gear set
18 ring gear of the third planetary gear set
19 planet carrier of the third planetary gear set
EM 1 first larger-dimensioned electric drive
EM 2 second smaller-dimensioned electric drive
WG harmonic drive as second fixed ratio
PS 1 first planetary gear set as superposition gearbox
PS 2 second planetary gear set as second fixed ratio
PS 3 third planetary gear set as first fixed ratio
Z1 second gearwheel of the second stage of the spur gear ratio
Z2 first gearwheel of the first stage of the spur gear ratio
Z3 second gearwheel of the first stage of the spur gear ratio
Z4 first gearwheel of the second stage of the spur gear ratio
Z6 intermediate gear

The invention claimed is:

1. A drive arrangement for a bicycle or pedelec, comprising:
a housing (2);
a manual drive shaft (1) in the housing (2);
a first electric drive (EM 1), a rotor (3) of the first electric drive (EM 1) arranged axially parallel to the manual drive shaft (1);
a second electric drive (EM2), a rotor (4) of the second electric drive (EM2) arranged coaxially to the manual drive shaft (1); and
a first planetary gear set (PS 1), the rotor (3) of the first electric drive (EM 1) coupled to the first planetary gear set (PS 1) as a superposition gear via a first fixed ratio,
wherein the rotor (4) of the second electric drive (EM 2) is coupled to the manual drive shaft (1) via a second fixed ratio, the manual drive shaft (1) is coupled to the first planetary gear set (PS 1) as the superposition gear, and the first planetary gear set (PS 1), as the superposition gear, is coupled to an output (5), and
wherein the first electric drive (EM 1) is dimensioned larger than the second electric drive (EM2).

2. The drive arrangement of claim 1, further comprising a single-stage or multi-stage spur gear train configured to provide the first fixed ratio between the rotor (3) of the first electric drive (EM 1) and the first planetary gear set (PS 1).

3. The drive arrangement of claim 1, wherein the coupling of the rotor (3) of the first electric drive (EM 1) to the first planetary gear set (PS 1) via the first fixed ratio is through an intermediate gear (Z6) or a chain drive, or a belt drive (10).

4. The drive arrangement of claim 1, wherein:
a sun gear (11) of the first planetary transmission (PS 1) is connected to the rotor (3) of the first electric drive (EM 1) via the first fixed gear;
the manual drive shaft (1) is connected to a planet carrier (12) of the first planetary transmission (PS 1); and
the output (5) is connected to a ring gear (13) of the first planetary transmission (PS 1).

5. The drive arrangement of claim 1, wherein:
a sun gear (11) of the first planetary transmission (PS 1) is connected to the rotor (3) of the first electric drive (EM 1) via the first fixed gear;
the manual drive shaft (1) is connected to a ring gear (13) of the first planetary transmission (PS 1); and
the output (5) is connected to a planet carrier (12) of the first planetary transmission (PS 1).

6. The drive arrangement of claim 1, wherein the manual drive shaft (1) is configured as a bottom bracket crankshaft, and the housing (2) is configured as a bottom bracket shell.

7. The drive arrangement of claim 1, wherein the output (5) is configured as a sprocket or a belt pulley.

8. The drive arrangement of claim 1, wherein one or both of the first electric drive (EM 1) and the second electric drive (EM 2) is configured as an electric machine operable both as a motor and as a generator.

9. A bicycle or pedelec, comprising the drive arrangement of claim 1.

10. A drive arrangement for a bicycle or pedelec, comprising:
a housing (2);
a manual drive shaft (1) in the housing (2);
a first electric drive (EM 1), a rotor (3) of the first electric drive (EM 1) arranged axially parallel to the manual drive shaft (1);
a second electric drive (EM2), a rotor (4) of the second electric drive (EM2) arranged coaxially to the manual drive shaft (1);
a first planetary gear set (PS 1), the rotor (3) of the first electric drive (EM 1) coupled to the first planetary gear set (PS 1) as a superposition gear via a first fixed ratio; and
another planetary gear set (PS 3) configured to provide the first fixed ratio between the rotor (3) of the first electric drive (EM 1) and the first planetary gear set (PS 1),
wherein the rotor (4) of the second electric drive (EM 2) is coupled to the manual drive shaft (1) via a second fixed ratio, the manual drive shaft (1) is coupled to the first planetary gear set (PS 1) as the superposition gear, and the first planetary gear set (PS 1), as the superposition gear, is coupled to an output (5).

11. A drive arrangement for a bicycle or pedelec, comprising:
a housing (2);
a manual drive shaft (1) in the housing (2);
a first electric drive (EM 1), a rotor (3) of the first electric drive (EM 1) arranged axially parallel to the manual drive shaft (1);
a second electric drive (EM2), a rotor (4) of the second electric drive (EM2) arranged coaxially to the manual drive shaft (1); and
a first planetary gear set (PS 1), the rotor (3) of the first electric drive (EM 1) coupled to the first planetary gear set (PS 1) as a superposition gear via a first fixed ratio; and a harmonic drive (WG), wherein the rotor (4) of the second electric drive (EM 2) is coupled to the manual drive shaft (1) via a second fixed ratio, the manual drive shaft (1) is coupled to the first planetary gear set (PS 1) as the superposition gear, the first planetary gear set (PS 1), as the superposition gear, is coupled to an output (5), and the harmonic drive (WG) is configured to provide the second fixed ratio between the rotor (4) of the second electric drive (EM 2) and the manual drive shaft (1).

12. The drive arrangement of claim 11, wherein a wave generator (6) of the harmonic drive (WG) is connected to the rotor (4) of the second electric drive (EM 2), a deformable inner bush (7) of the harmonic drive (WG) has external gearing and is connected to the manual drive shaft (1), and an outer bush (8) of the harmonic drive (WG) has internal gearing and is fixed to the housing.

13. A drive arrangement for a bicycle or pedelec, comprising:

a housing (2);

a manual drive shaft (1) in the housing (2);

a first electric drive (EM 1), a rotor (3) of the first electric drive (EM 1) arranged axially parallel to the manual drive shaft (1);

a second electric drive (EM2), a rotor (4) of the second electric drive (EM2) arranged coaxially to the manual drive shaft (1);

a first planetary gear set (PS 1), the rotor (3) of the first electric drive (EM 1) coupled to the first planetary gear set (PS 1) as a superposition gear via a first fixed ratio; and a second planetary gear set (PS 2), wherein the rotor (4) of the second electric drive (EM 2) is coupled to the manual drive shaft (1) via a second fixed ratio, the manual drive shaft (1) is coupled to the first planetary gear set (PS 1) as the superposition gear, the first planetary gear set (PS 1), as the superposition gear, is coupled to an output (5), and the second planetary gear set (PS 2) is configured to provide the second fixed ratio between the rotor (4) of the second electric drive (EM 2) and the manual drive shaft (1).

14. The drive arrangement of claim 13, wherein the second planetary gear set (PS 2) comprises a stepped planet.

* * * * *